United States Patent
Weng et al.

(10) Patent No.: US 9,681,391 B2
(45) Date of Patent: Jun. 13, 2017

(54) POWER ADAPTATION APPARATUS AND POWER ADAPTATION METHOD FOR CONTROLLING UPLINK/DOWNLINK POWER

(71) Applicant: MEDIATEK INC., Hsin-Chu (TW)

(72) Inventors: Po-Shen Weng, Hsinchu County (TW); Yuan Ho, Kaohsiung (TW); Sung-Chiao Li, Taoyuan (TW); Chen-Wei Hsu, Taichung (TW); Wen-Hsien Ho, Hsinchu (TW); Qian-Zhi Huang, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/875,712

(22) Filed: Oct. 6, 2015

(65) Prior Publication Data
US 2016/0037457 A1 Feb. 4, 2016

Related U.S. Application Data

(63) Continuation of application No. 13/366,380, filed on Feb. 6, 2012, now Pat. No. 9,185,660.
(Continued)

(51) Int. Cl.
*H04W 52/20* (2009.01)
*H04W 52/24* (2009.01)
(Continued)

(52) U.S. Cl.
CPC ......... *H04W 52/20* (2013.01); *H04W 52/241* (2013.01); *H04W 52/346* (2013.01);
(Continued)

(58) Field of Classification Search
CPC . H04W 88/02; H04W 88/08; H04W 52/0206; H04W 52/0212
See application file for complete search history.

(56) References Cited

U.S. PATENT DOCUMENTS 8,688,054 B2    4/2014  Pietraski
9,185,660 B2 *  11/2015 Weng .................. H04W 52/241
(Continued)

FOREIGN PATENT DOCUMENTS

CN        1684384 A    10/2005
CN      101772906 A     7/2010
(Continued)

OTHER PUBLICATIONS

Samsung, E-DCH outer loop power control, TSG-RAN WG1 Meeting #38bis, R1-041096, Sep. 20-24, 2004, pp. 1-2, XP002434846, Seoul, Korea.

*Primary Examiner* — Paul H Masur
*Assistant Examiner* — Michael Phillips
(74) *Attorney, Agent, or Firm* — Winston Hsu (57) ABSTRACT

A power adaptation apparatus for a wireless communication channel includes a power ratio compensator. The power ratio compensator is capable of receiving a channel quality indicator and compensating a power ratio parameter according to the channel quality indicator, wherein the power ratio parameter defines a relation between power of the wireless communication channel and power of another wireless communication channel, and is referenced for setting the power of the wireless communication channel.

8 Claims, 9 Drawing Sheets

Related U.S. Application Data (60) Provisional application No. 61/477,685, filed on Apr. 21, 2011.

(51) Int. Cl.
*H04W 52/34* (2009.01)
*H04W 72/04* (2009.01)
*H04W 52/28* (2009.01)
*H04W 52/08* (2009.01)
*H04W 52/12* (2009.01)
*H04W 52/14* (2009.01)

(52) U.S. Cl.
CPC ........ *H04W 72/0406* (2013.01); *H04W 52/08* (2013.01); *H04W 52/12* (2013.01); *H04W 52/146* (2013.01); *H04W 52/286* (2013.01)

(56) References Cited

U.S. PATENT DOCUMENTS

| | | | |
|---|---|---|---|
| 2003/0092463 A1* | 5/2003 | Charriere | H04W 52/12 455/522 |
| 2003/0193913 A1 | 10/2003 | Murata | |
| 2004/0063408 A1 | 4/2004 | Leizerovich | |
| 2005/0085255 A1 | 4/2005 | Andersson | |
| 2005/0130690 A1* | 6/2005 | Shinozaki | H04W 52/12 455/522 |
| 2005/0143112 A1* | 6/2005 | Jonsson | H04W 52/125 455/522 |
| 2005/0143116 A1 | 6/2005 | Hsu | |
| 2006/0034241 A1 | 2/2006 | Czaja | |
| 2006/0056346 A1* | 3/2006 | Vadgama | H04L 47/14 370/329 |
| 2006/0079264 A1* | 4/2006 | Gu | H04W 52/12 455/522 |
| 2006/0084459 A1* | 4/2006 | Phan | H04W 52/12 455/522 |
| 2006/0109794 A1* | 5/2006 | Muszynski | H04L 1/1812 370/251 |
| 2006/0140214 A1 | 6/2006 | Kroener | |
| 2006/0165032 A1 | 7/2006 | Hamalainen | |
| 2006/0172758 A1* | 8/2006 | Ishii | H04W 52/325 455/522 |
| 2006/0236190 A1 | 10/2006 | Vinh | |
| 2006/0252450 A1 | 11/2006 | Wigard | |
| 2006/0268773 A1 | 11/2006 | Ranta-aho | |
| 2007/0121554 A1 | 5/2007 | Luo | |
| 2007/0149233 A1* | 6/2007 | Wang | H04W 52/325 455/522 |
| 2007/0223495 A1* | 9/2007 | Fukui | H04L 1/0026 370/395.64 |
| 2008/0008212 A1 | 1/2008 | Wang | |
| 2008/0045160 A1* | 2/2008 | Nilsson | H04W 52/12 455/69 |
| 2008/0064386 A1* | 3/2008 | Nibe | H04W 74/0808 455/422.1 |
| 2008/0188265 A1* | 8/2008 | Carter | H04W 52/346 455/561 |
| 2008/0253300 A1* | 10/2008 | Wakabayashi | H04B 17/336 370/252 |
| 2009/0109937 A1 | 4/2009 | Cave | |
| 2009/0154403 A1 | 6/2009 | Niwano | |
| 2009/0181714 A1 | 7/2009 | Yajima | |
| 2009/0190485 A1 | 7/2009 | Bjorkegren | |
| 2009/0209279 A1 | 8/2009 | Kuroda | |
| 2009/0221251 A1* | 9/2009 | Yi | H04L 1/0036 455/226.3 |
| 2009/0227209 A1 | 9/2009 | Craig | |
| 2009/0238148 A1 | 9/2009 | Englund | |
| 2009/0325506 A1 | 12/2009 | Nibe | |
| 2010/0041389 A1 | 2/2010 | Cave | |
| 2010/0246520 A1 | 9/2010 | Andersson | |
| 2010/0271969 A1* | 10/2010 | Iizuka | H04W 52/16 370/252 |
| 2010/0303030 A1* | 12/2010 | Andersson | H04W 52/12 370/329 |
| 2011/0003561 A1 | 1/2011 | Miao | |
| 2011/0009150 A1* | 1/2011 | Cairns | H04W 52/12 455/522 |
| 2011/0044263 A1 | 2/2011 | El-saidny | |
| 2011/0122968 A1 | 5/2011 | Jongren | |
| 2011/0149914 A1 | 6/2011 | Tidestav | |
| 2011/0228740 A1 | 9/2011 | Axelsson | |
| 2012/0008563 A1 | 1/2012 | Johansson | |
| 2012/0157152 A1 | 6/2012 | Blomgren | |
| 2012/0195224 A1* | 8/2012 | Kazmi | H04B 7/0404 370/252 |
| 2013/0021983 A1* | 1/2013 | Sadek | H04W 72/1215 370/329 |

FOREIGN PATENT DOCUMENTS

| | | |
|---|---|---|
| EP | 1 587 222 A2 | 10/2005 |
| EP | 1 928 105 A1 | 6/2008 |
| EP | 1 587 222 A3 | 4/2009 |
| EP | 2 178 225 A1 | 4/2010 |
| WO | 2004073202 A1 | 8/2004 |
| WO | 2009078762 A1 | 6/2009 |

* cited by examiner

POWER ADAPTATION APPARATUS AND POWER ADAPTATION METHOD FOR CONTROLLING UPLINK/DOWNLINK POWER

CROSS REFERENCE TO RELATED APPLICATION

This is a continuation of U.S. application Ser. No. 13/366,380 (filed on Feb. 6, 2012), which claims the benefit of U.S. provisional application No. 61/477,685 (filed on Apr. 21, 2011). The entire contents of the related applications are incorporated herein by reference.

BACKGROUND

The disclosed embodiments of the present invention relate to setting power of a wireless communication channel, and more particularly, to a power adaptation apparatus and power adaptation method for controlling uplink/downlink power.

Figure 1:
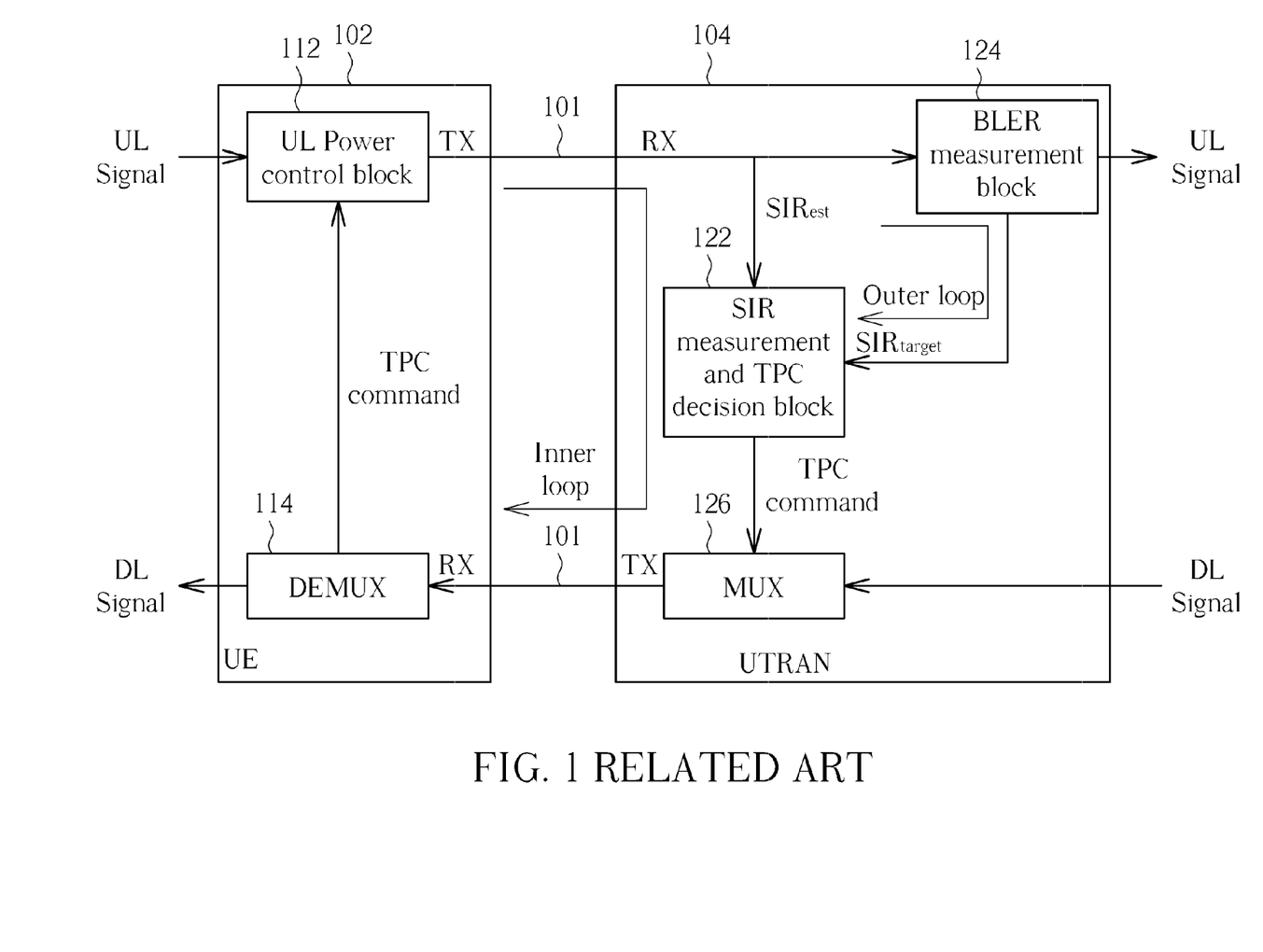
FIG. 1 is a block diagram illustrating a conventional DCH uplink power control mechanism.

Inner/outer loop power control is a well-known method of dedicated channel (DCH) power adaptation as specified in universal mobile telecommunications system (UMTS)—frequency-division duplexing (FDD) specification. FIG. 1 is a block diagram illustrating a conventional DCH uplink (UL) power control mechanism. The user equipment (UE) 102 communicates with the UMTS terrestrial radio access network (UTRAN) 104 via a radio interface 101. The UE 102 may include a UL power control block 112 and a demultiplexer (DEMUX) 114, where the UL power control block 112 is arranged to set the power of the UL physical channel, and the DEMUX 114 is arranged to output the transmit power control (TPC) command received from the downlink (DL) physical channel to the UL power control block 112 such that the UL power control block 112 would adjust the power of the UL physical channel in response to the TPC command. Regarding the UTRAN 104, it may include a signal-to-interference ratio (SIR) measurement and TPC decision block 122, a block error rate (BLER) measurement block 124, and a multiplexer (MUX) 126. The inner loop power control can be used to adaptively control the UL power in response to the radio quality variance. Thus, the SIR measurement and TPC decision block 122 is arranged to measure the radio quality (i.e., $SIR_{est}$), and compares the measured radio quality with the desired radio quality (i.e., $SIR_{target}$). When $SIR_{est}$ is found smaller than $SIR_{target}$, implying that the actual radio quality is lower than the desired one, the SIR measurement and TPC decision block 122 generates an "UP" TPC command, and transmits the "UP" TPC command to the UE 102 through the MUX 126. Next, the UL power is increased by the UL power control block 112 due to the "UP" TPC command. When $SIR_{est}$ is found larger than $SIR_{target}$, implying that the actual radio quality is higher than the desired one, the SIR measurement and TPC decision block 122 generates a "DOWN" TPC command. Next, the UL power is decreased by the UL power control block 112 due to the "DOWN" TPC command. In this way, the radio quality is adapted by the inner power control which adjusts power of the UL dedicated physical control channel (DPCCH) and dedicated physical data channel (DPDCH) based on $SIR_{est}$ and $SIR_{target}$.

$SIR_{target}$ is an estimated SIR for achieving a target BLER of DCH. For example, the target BLER can be 10%. However, the value of $SIR_{target}$ may be out-of-date because radio condition is always changing. Thus, the outer loop power control can be used to update $SIR_{target}$ once the currently used $SIR_{target}$ is no longer proper. Therefore, the BLER measurement block 124 is used to obtain a measured BLER of DCH, and then increase or decrease $SIR_{target}$ according to the measured BLER.

To increase the uplink data rate, throughput and capacity, high speed uplink packet access (HSUPA) is therefore developed. Within the HSUPA framework, the enhanced dedicated channel (E-DCH) is introduced as a new transport channel for carrying user data on the uplink. On the physical layer level, the E-DCH includes two uplink channels, an E-DCH dedicated physical control channel (E-DPCCH) and an E-DCH dedicated physical data channel (E-DPDCH). Based on the HSUPA specification, the power of E-DPCCH and E-DPDCH of E-DCH is directly set in relation to power of DPCCH. For example, in accordance with the conventional design, the power of DPCCH is controlled according to the inner loop power control and outer loop power control shown in FIG. 1. However, there is no mechanism available to adapt the E-DCH BLER. In other words, $SIR_{target}$ cannot be updated even if the radio condition of E-DCH has changed. Hence, $SIR_{target}$ would be out-of-date for E-DCH, and the originally expected E-DCH BLER cannot be achieved. As a result, the HSUPA uplink transmission throughput/performance may be corrupted in a high-interference radio condition. Besides, the HSUPA uplink transmission power may be over-estimated to make an unreasonable low E-DCH BLER in a low-interference radio condition. To put it simply, the original target E-DCH BLER may become unreachable when the radio condition is variant. Thus, regarding the HSUPA transmission case, there is a need for an innovative power adaptation design to improve transmission performance in variant radio conditions.

SUMMARY

In accordance with exemplary embodiments of the present invention, a power adaptation apparatus and power adaptation method for compensating a power ratio parameter used for setting power of a wireless communication channel are proposed to solve the above-mentioned problem.

According to a first aspect of the present invention, an exemplary power adaptation apparatus for a wireless communication channel is disclosed. The exemplary power adaptation apparatus includes a power ratio compensator. The power ratio compensator is capable of receiving a channel quality indicator, and compensating a power ratio parameter according to the channel quality indicator, wherein the power ratio parameter defines a relation between power of the wireless communication channel and power of another wireless communication channel, and is referenced for setting the power of the wireless communication channel.

According to a second aspect of the present invention, an exemplary power adaptation method for a wireless communication channel is disclosed. The exemplary power adaptation method includes following steps: receiving a channel quality indicator, and compensating a power ratio parameter according to the channel quality indicator, wherein the power ratio parameter defines a relation between power of the wireless communication channel and power of another wireless communication channel, and is referenced for setting the power of the wireless communication channel.

According to a third aspect of the present invention, an exemplary power adaptation apparatus is disclosed. The exemplary power adaptation apparatus includes a measurement and decision block. The measurement and decision block is capable of receiving a plurality of target channel quality values corresponding to a plurality of wireless communication channels, respectively, determining a desired channel quality value according to the target channel quality values, and controlling a power control block according to a measured channel quality value of a wireless communication channel and the desired channel quality value.

According to a fourth aspect of the present invention, an exemplary power adaptation method is disclosed. The exemplary power adaptation method includes following steps: receiving a plurality of target channel quality values corresponding to a plurality of wireless communication channels, respectively; determining a desired channel quality value according to the target channel quality values; and controlling a power control block according to a measured channel quality value of a wireless communication channel and the desired channel quality value.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 2:
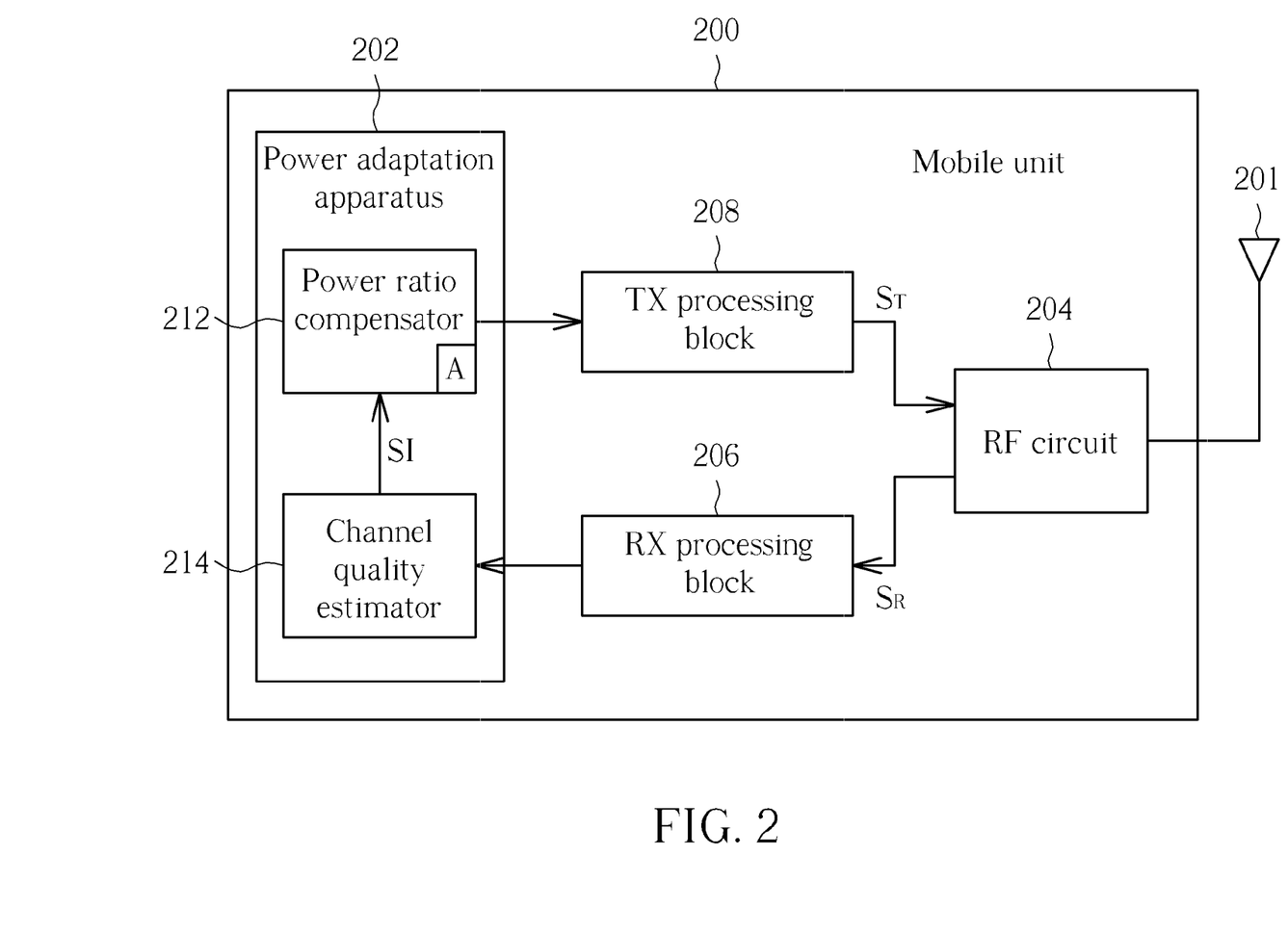
FIG. 2 is a block diagram illustrating a first generalized power adaptation apparatus according to an exemplary embodiment of the present invention.

FIG. 2 is a block diagram illustrating a first generalized power adaptation apparatus according to an exemplary embodiment of the present invention. The generalized power adaptation apparatus 202 can be disposed in a mobile unit 200 having a radio-frequency (RF) circuit 204, a reception (RX) processing block 206, and a transmission (TX) processing block 208. The RF circuit 204 can be coupled to an antenna 201, and used for processing an RF signal received by the antenna 201 to thereby generate a received signal $S_R$ to the RX processing block 206. Besides, the TX processing block 208 is capable of generating a transmission signal $S_T$ to the RF circuit 204, and then the RF circuit 204 is capable of outputting the transmission signal $S_T$ over the air via the antenna 201. The channel quality estimator 214 is capable of estimating channel quality of a wireless communication channel (e.g., a DL data channel) according to an output of the RX processing block 206 and accordingly generating a channel quality indicator SI to the power ratio compensator 212. Regarding the power ratio compensator 212, it is capable of receiving the channel quality indicator SI, and compensating/adjusting a power ratio parameter A according to the channel quality indicator SI, wherein the power ratio parameter A can define a relation between power of the wireless communication channel (e.g., a UL data channel) and power of another wireless communication channel (e.g., a UL control channel), and is thus referenced for setting the power of the wireless communication channel (e.g., a UL data channel).

Figure 3:
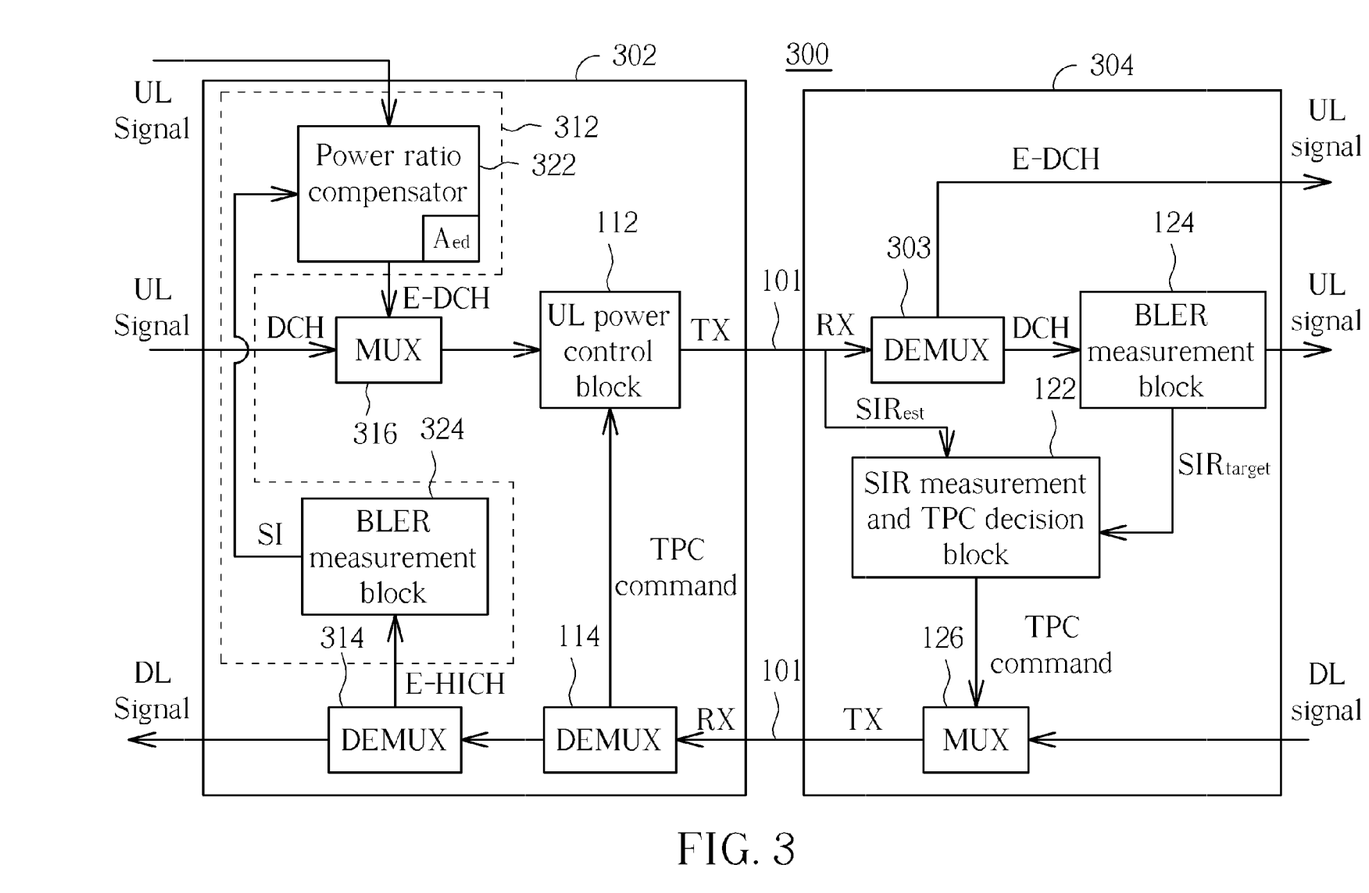
FIG. 3 is a block diagram illustrating a wireless communication system employing the exemplary power adaptation apparatus shown in FIG. 2 according to an exemplary embodiment of the present invention.

Please refer to FIG. 3, which is a block diagram illustrating a wireless communication system employing the exemplary power adaptation apparatus shown in FIG. 2 according to an exemplary embodiment of the present invention. The exemplary communication system 300 may include a UE 302 and a UTRAN 304 communicating with each other via a radio interface 101. Regarding the UTRAN 304, it may include a DEMUX 303 and the aforementioned SIR measurement and TPC decision block 122, BLER measurement block 124, and MUX 126, where the DEMUX 303 can demultiplex a UL signal on E-DCH and a UL signal on DCH. Regarding the UE 302, it may include a power adaptation apparatus 312, a DEMUX 314, a MUX 316, and the aforementioned UL power control block 112 and DEMUX 114, where the DEMUX 314 can demultiplex a DL signal and a signal on E-DCH hybrid automatic repeat request indicator channel (E-HICH), the MUX 316 can multiplex a UL signal on DCH and a UL signal on E-DCH. In this exemplary embodiment, the implementation of the power adaptation apparatus 312 is based on the exemplary configuration shown in FIG. 2, and therefore may include a power ratio compensator 322 that realizes the power ratio compensator 212 shown in FIG. 2, and a BLER measurement block 324 that realizes the channel quality estimator 214 shown in FIG. 2. More specifically, as the indicator channel (e.g., E-HICH) would be used to carry acknowledgement indicator ACK and/or negative acknowledgement indicator NACK for each data delivery, the BLER measurement block 324 is capable of generating the channel quality indicator SI by estimating BLER according to acknowledgement indicators and/or negative acknowledgement indicators transmitted via E-HICH. For example, the BLER measurement block 324 may count acknowledgement indicators ACK and/or negative acknowledgement indicators NACK received during a specific number of transmission time intervals (e.g., 50 TTIs), and then determine the BLER based on the number of acknowledgement indicators ACK and/or the number of negative acknowledgement indicators NACK. Supposing that ACK % is the percentage of the received acknowledgement indicators among all of the received acknowledgement and negative acknowledgement indicators, the BLER can be equal to 1-ACK %.

After receiving the channel quality indicator SI (e.g., an estimated BLER) generated from the BLER measurement block 324, the power ratio compensator 322 is capable of deciding whether the power ratio $A_{ed}$ should be increased or decreased according to the channel quality indicator SI. Please note that in this embodiment, $$A_{ed} = \frac{\beta_{ed}}{\beta_c},$$

where $\beta_{ed}$ is a gain factor of E-DPDCH of E-DCH, and $\beta_c$ is a gain factor of DPCCH. The power of DPCCH can be adaptively adjusted by the inner loop power control using the SIR measurement and TPC decision block 122 and/or the outer loop power control using the BLER measurement block 124. The uplink transmit power control procedure can control the power of a DPCCH and/or its corresponding DPDCHs (if present) to meet target BLER of DCH (if present). Therefore, $\beta_{ed}$ used by UE 302 can be initialized by $\beta_c$ given by UTRAN 304 and $A_{ed}$ used by UE 302. Actually, under given $\beta_c$ and $A_{ed}$, the initial value of $\beta_{ed}$ is allowed to be shifted to a value within a tolerance range (e.g., ±1.5 dB) to thereby compensate for non-ideal effects caused by imperfect circuit component (s) employed by the UE 302. Hence, the power ratio compensator 322 can take advantage of such a tolerance range to adjust the power ratio $A_{ed}$ for tracking the expected E-DCH BLER. That is, when the power ratio $A_{ed}$ is adjusted by the power ratio compensator 322 in response to the measured E-DCH BLER, $\beta_{ed}$ can be properly compensated and the power of E-DPDCH is changed/updated accordingly.

Figure 4:
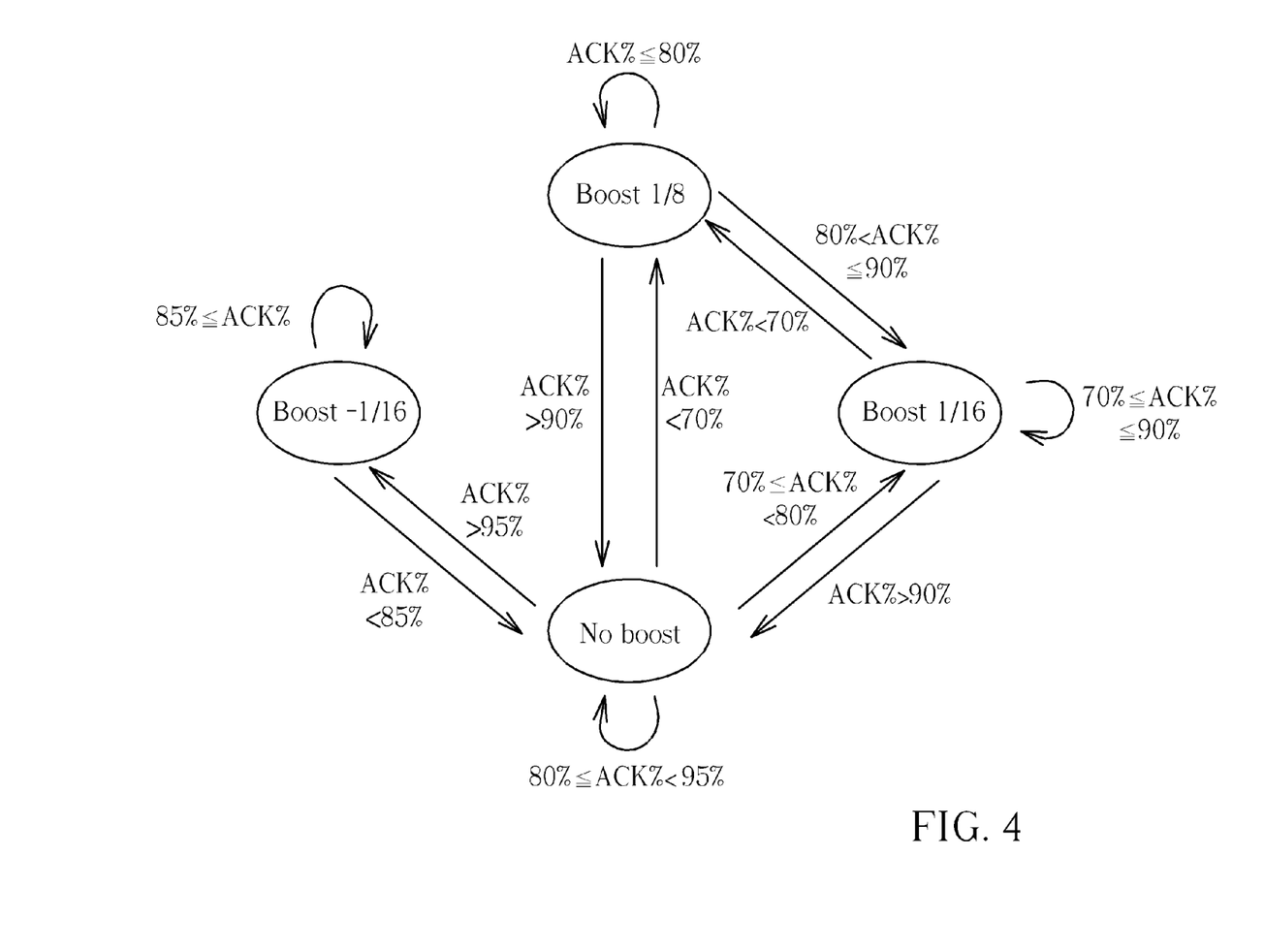
FIG. 4 is a diagram illustrating a state machine employed by a power ratio compensator shown in FIG. 3.

Please refer to FIG. 4, which is a diagram illustrating a state machine employed by the power ratio compensator 322 shown in FIG. 3. The exemplary state machine can have 4 states, including "No boost" state, "Boost 1/16" state, "Boost 1/8" state and "Boost -1/16" state. As mentioned above, BLER can be equal to 1-ACK %. When the power ratio compensator 322 enters the "No boost" state, $A_{ed}$ can be set by a default value, thus making $\beta_{ed}$ equal to an initial value defined under given $\beta_c$ and original $A_{ed}$. When the power ratio compensator 322 enters the "Boost 1/16" state, $A_{ed}$ can be set by an adjusted value equal to a default value multiplied with a scaling factor $$1 + \frac{1}{16},$$

thus making $\beta_{ed}$ have a compensated value equal to the initial value multiplied with the scaling factor $$1 + \frac{1}{16}.$$

When the power ratio compensator 322 enters the "Boost 1/8" state, $A_{ed}$ can be set by an adjusted value equal to the default value multiplied with a scaling factor $$1 + \frac{1}{8},$$

thus making $\beta_{ed}$ have a compensated value equal to the initial value multiplied with the scaling factor $$1 + \frac{1}{8}.$$

When the power ratio compensator 322 enters the "Boost -1/16" state, $A_{ed}$ can be set by an adjusted value equal to the default value multiplied with a scaling factor $$1 - \frac{1}{16},$$

thus making $\beta_{ed}$ have a compensated value equal to the initial value multiplied with the scaling factor $$1 - \frac{1}{16}.$$

The acknowledgement indicator percentage ACK % can be derived from statistics of acknowledgement indicators ACK and/or negative acknowledgement indicators NACK received during N TTIs, where N may be any positive value (e.g., 50), depending upon actual design requirement/consideration. In this exemplary state machine design, 90% is a normal threshold for enabling or disabling the boost of $A_{ed}/\beta_{ed}$. However, to avoid frequent transitions between different states (e.g., "No boost" state and "Boost -1/16" state), an amount of hysteresis can be particularly added to the normal threshold. For example, the power ratio compensator 322 can still stay at the "Boost -1/16" state when ACK % reaches a value just lower than 90%, and can be only allowed to have a transition from the "Boost -1/16" state to the "No boost" state when ACK % is further decreased to a value lower than 85%. As can be readily seen from FIG. 4, when the communication system 300 operates in a high-interference radio condition, implying that the E-DCH BLER may be higher than a desired level, the power ratio compensator 322 could enter the "Boost 1/16" state or "Boost 1/8" state, and the UL transmission power can be accordingly boosted to improve the HSUPA throughput. When the communication system 300 operates in a low-interference radio condition, implying that the E-DCH BLER may be lower than the desired level, the power ratio compensator 322 could enter the "Boost -1/16" state, and the UL transmission power of the HSUPA transmission can be accordingly lowered to thereby save the power consumption.

Please note that the state machine shown in FIG. 4 is for illustrative purposes only, and is not meant to be a limitation of the present invention. In practice, making modifications to the exemplary state machine shown in FIG. 4 without departing from the spirit of the present invention is feasible. To put it simply, the spirit of the present invention is obeyed as long as the power ratio parameter referenced for configuring power of E-DPDCH in the HSUPA transmission is adaptively compensated according to the measured channel quality (e.g., BLER).

Regarding the exemplary power adaptation apparatus 202 shown in FIG. 2, the power ratio compensator 212 and the channel quality estimator 214 are both disposed in the mobile unit 200. However, this is not meant to be a limitation of the present invention. Please refer to FIG. 5, which is a block diagram illustrating a second generalized power adaptation apparatus according to an exemplary embodiment of the present invention. The generalized power adaptation apparatus 502 may include a power ratio compensator 504 disposed in the mobile unit 510 having an RF circuit 512, an RX processing block 514, and a TX processing block 516. The generalized power adaptation apparatus 502 may further include a channel quality estimator 506 disposed in the base station 520 having an RF circuit 522, an RX processing block 524, and a TX processing block 526. The RF circuit 512 can be coupled to an antenna 511, and used for processing an RF signal transmitted from the RF circuit 522 via an antenna 521; similarly, the RF circuit 522 can be coupled to the antenna 521, and used for processing an RF signal transmitted from the RF circuit 512 via the antenna 511. As a person skilled in the pertinent art can readily understand operations of the RF circuits 512, 522, the RX processing blocks 514, 524, and the TX processing blocks 516, 526, further description is omitted here for brevity.

Figure 5:
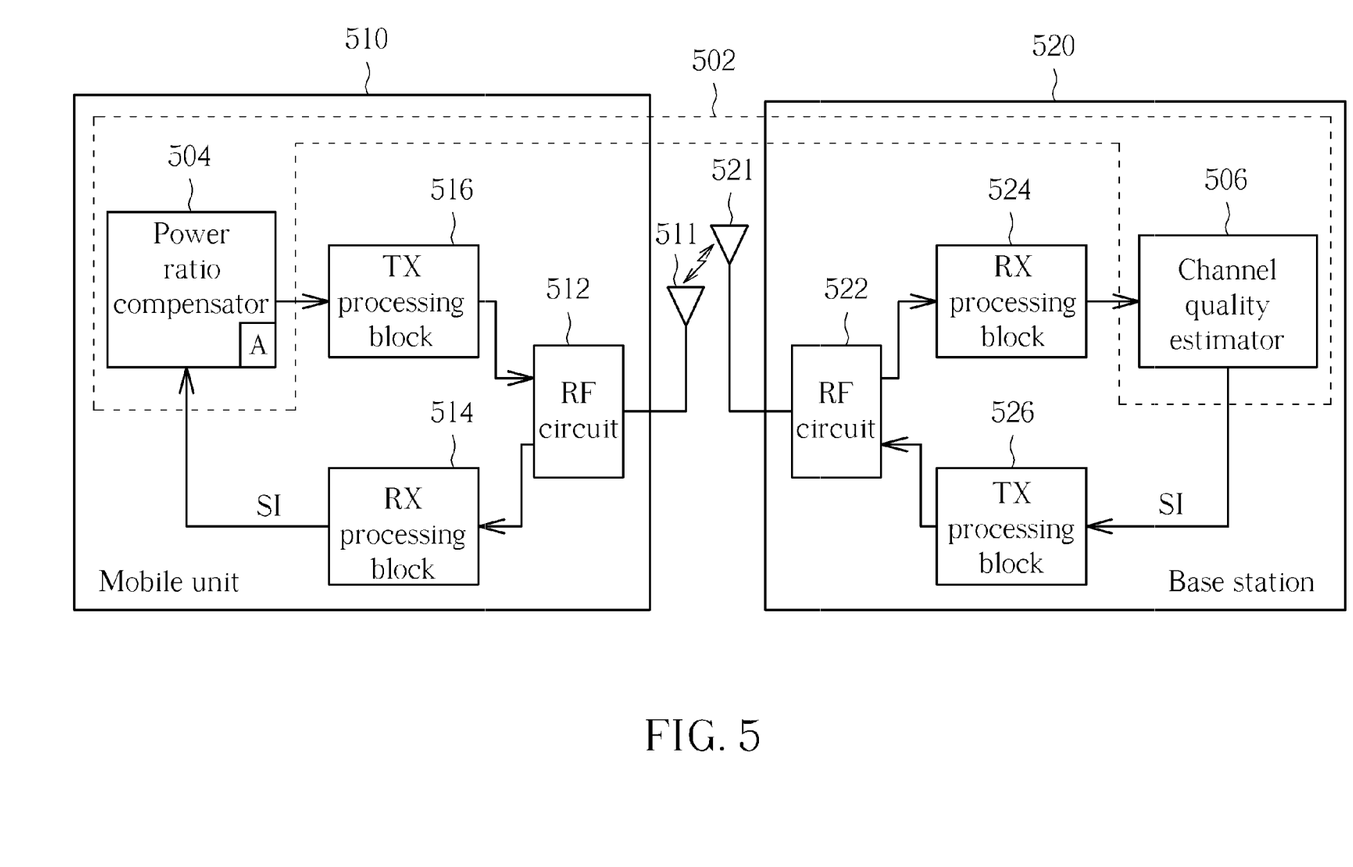
FIG. 5 is a block diagram illustrating a second generalized power adaptation apparatus according to an exemplary embodiment of the present invention.

In this exemplary design, the channel quality estimator 506 is capable of estimating channel quality of a wireless communication channel (e.g., a UL data channel) according to an output of the RX processing block 524 and accordingly generating a channel quality indicator SI. As in this embodiment the channel quality estimator 506 is disposed in the base station 520, the generated channel quality indicator SI could be transmitted to the mobile unit 510 through the TX processing block 526, the RF circuit 522, and the antenna 521. Next, the power ratio compensator 504 is capable of receiving the channel quality indicator SI transmitted from the base station 520 through the antenna 511, the RF circuit 512, and the RX processing block 514, and compensating/adjusting the power ratio parameter A according to the received channel quality indicator SI.

Figure 6:
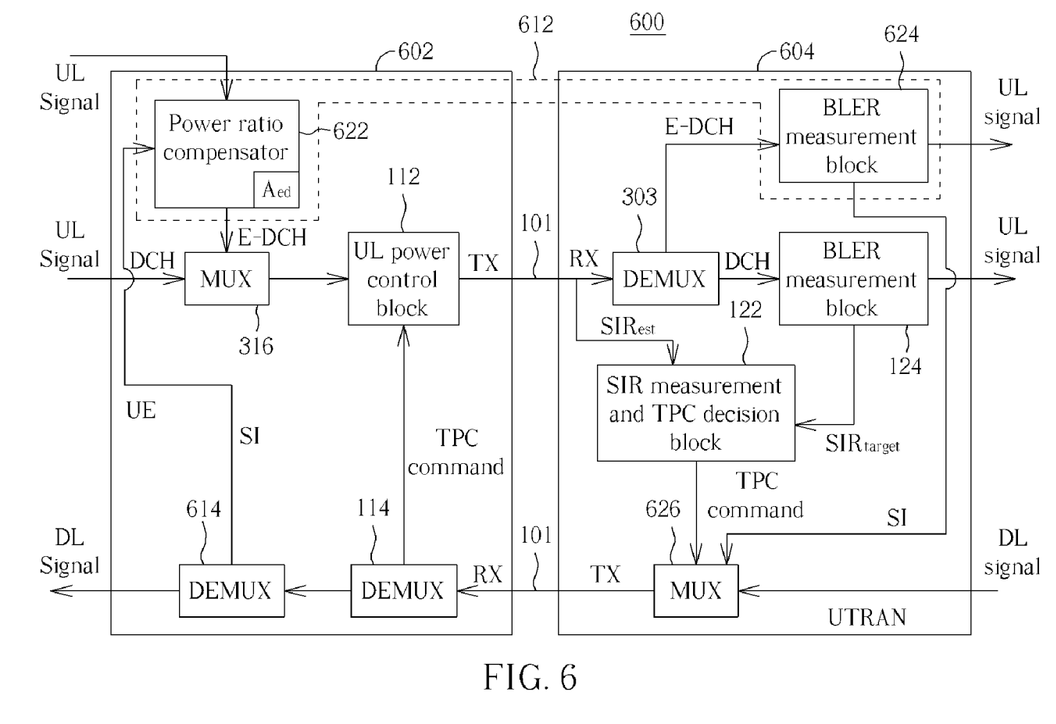
FIG. 6 is a block diagram illustrating a wireless communication system employing the exemplary power adaptation apparatus shown in FIG. 5 according to an exemplary embodiment of the present invention.

Please refer to FIG. 6, which is a block diagram illustrating a wireless communication system employing the exemplary power adaptation apparatus shown in FIG. 5 according to an exemplary embodiment of the present invention. The exemplary communication system 600 may include a UE 602 and a UTRAN 604 communicating with each other via a radio interface 101. Regarding the UTRAN 604, it may include a MUX 626, a BLER measurement block 624, and the aforementioned DEMUX 303, SIR measurement and TPC decision block 122, and BLER measurement block 124, where the MUX 626 is capable of multiplexing the TPC command, the signal quality indicator (e.g., BLER) SI, and the DL signal. Regarding the UE 602, it may include a power ratio compensator 622, a DEMUX 614, and the aforementioned MUX 316, UL power control block 112 and DEMUX 114, where the DEMUX 614 is capable of demultiplexing a DL signal and a received signal quality indicator SI. In this exemplary embodiment, the implementation of a power adaptation apparatus 612 is based on the exemplary configuration shown in FIG. 5, and therefore includes the power ratio compensator 622 that realizes the power ratio compensator 504 shown in FIG. 5, and the BLER measurement block 624 that realizes the channel quality estimator 506 shown in FIG. 5. More specifically, as in this embodiment the BLER measurement block 624 is disposed in the UTRAN 604, the BLER measurement block 624 can directly estimate BLER of E-DCH and then generate the channel quality indicator SI (e.g., the measured BLER). Next, the UTRAN 604 is capable of transmitting the channel quality indicator SI to the UE 602 by the DL transmission. After receiving the channel quality indicator SI (e.g., the estimated BLER) generated from the BLER measurement block 624 disposed in the UTRAN 604, the power ratio compensator 622 disposed in the UE 602 is capable of deciding whether the power ratio $A_{ed}$ should be increased or decreased. By way of example, but not limitation, the power ratio compensator 622 may also operate in accordance with the exemplary state machine shown in FIG. 4.

In above exemplary embodiments, the proposed power adaptation apparatuses are used for UL power adaptation (e.g., power adaptation of E-DPDCH of HSUPA transmission). However, any wireless communication system employing the proposed power adaptation apparatus for adaptively adjusting a power ratio parameter referenced for setting power of a wireless communication channel according to channel quality of the wireless communication would obey the spirit of the present invention and fall within the scope of the present invention. For example, the UL power adaptation implemented by the proposed power adaptation apparatus 202 is not limited to power compensation of the HSUPA transmission. In some embodiments, the UL power adaptation implemented by the proposed power adaptation apparatus 202 may be applied to UL transmission complying with other wireless communication specification. Besides, supposing that a base station is allowed to control each DL power used for communicating with a mobile unit, the use of the proposed power adaptation apparatus may be extended to DL power adaptation.

Figure 7:
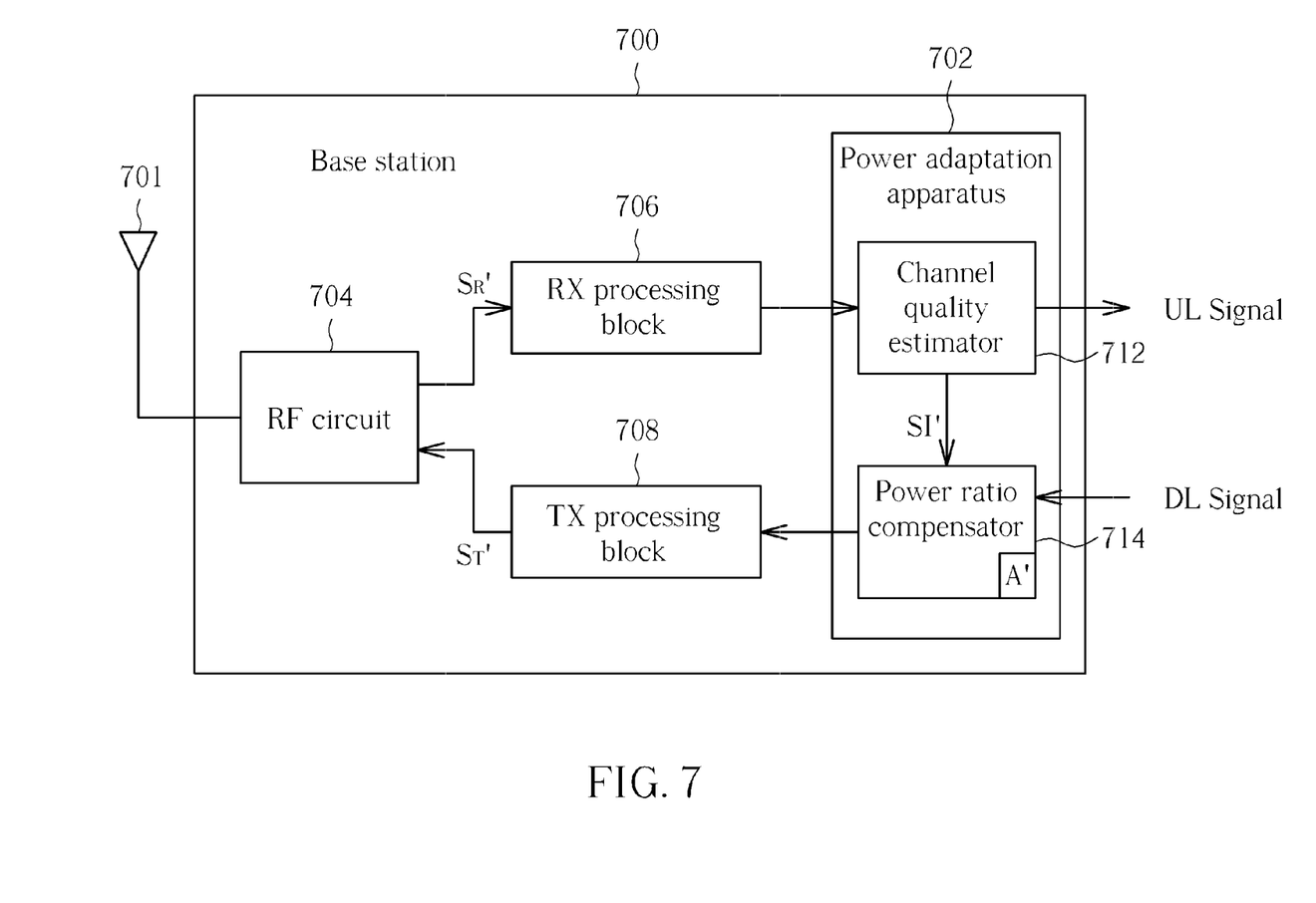
FIG. 7 is a block diagram illustrating a third generalized power adaptation apparatus according to an exemplary embodiment of the present invention.

Please refer to FIG. 7, which is a block diagram illustrating a third generalized power adaptation apparatus according to an exemplary embodiment of the present invention. In this embodiment, the generalized power adaptation apparatus 702 is disposed in a base station 700 having an RF circuit 704, an RX processing block 706, and a TX processing block 708. The RF circuit 704 can be coupled to an antenna 701, and used for processing an RF signal received by the antenna 701 to thereby generate a received signal $S_R'$ to the RX processing block 706. Besides, the TX processing block 708 is capable of generating a transmission signal $S_T'$ to the RF circuit 704, and then the RF circuit 704 is capable of outputting the transmission signal $S_T'$ over the air via the antenna 701. The channel quality estimator 712 is capable of estimating channel quality of a wireless communication channel (e.g., a DL data channel) according to an output of the RX processing block 706 and accordingly generating a channel quality indicator SI' to the power ratio compensator 714. The power ratio compensator 714 is capable of receiving the channel quality indicator SI', and compensating/adjusting a power ratio parameter A' according to the channel quality indicator SI', wherein the power ratio parameter A' defines a relation between power of the wireless communication channel (e.g., the DL data channel) and power of another wireless communication channel, and is thus referenced for setting the power of the wireless communication channel (e.g., the DL control channel).

In above exemplary embodiments, the channel quality estimator 214/506/712 may be configured to generate the channel quality indicator by estimating BLER. However, any means capable of detecting the instant/non-instant radio condition of a wireless communication channel whose power is to be adaptively compensated/adjusted for achieving higher throughput in a high-interference radio condition or lower power consumption in a low-interference radio condition may be employed by the channel quality estimator 214/506/712. For example, in an alternative design, the channel quality estimator 214/506/712 may be configured to generate the channel quality indicator by referring to information derived from a radio link control (RLC) layer automatic repeat request (ARQ) process.

In above exemplary embodiments, the power ratio compensator may include one element, such as a hardware element, used for receiving the channel quality indicator, and another element, such as a hardware element, used for compensating/adjusting the power ratio parameter according to the channel quality indicator. In an alternative design, the power ratio compensator may be implemented by a processor which is capable of receiving the channel quality indicator and executing a software program (e.g., firmware) to compensate/adjust the power ratio parameter according to the channel quality indicator. To put it simply, the aforementioned power adaptation apparatus may be implemented by any feasible means, depending upon actual design requirement/consideration.

Figure 8:
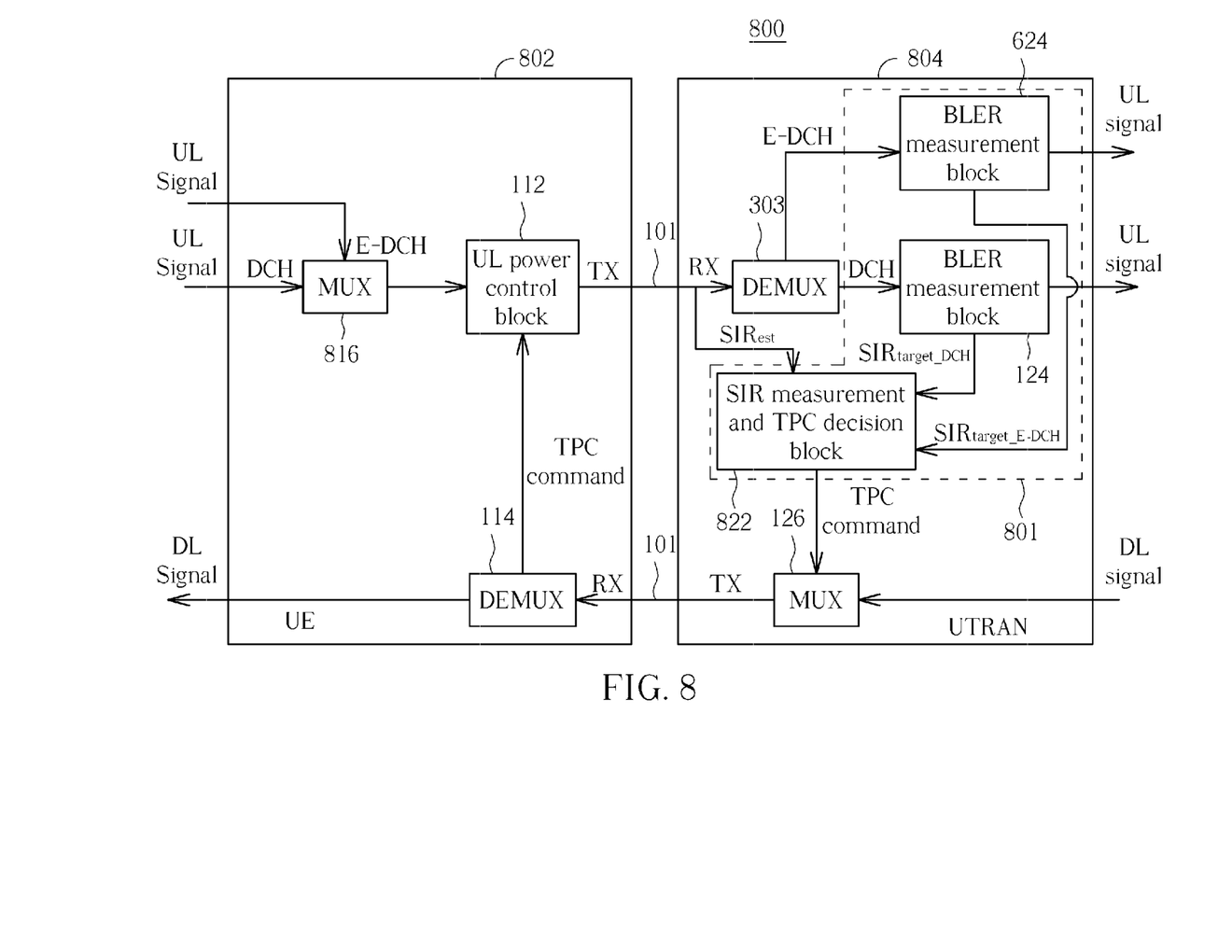
FIG. 8 is a block diagram illustrating a wireless communication system employing a UL power adaptation mechanism according to an exemplary embodiment of the present invention.

FIG. 8 is a block diagram illustrating a wireless communication system employing a UL power adaptation mechanism according to an exemplary embodiment of the present invention. The exemplary communication system 800 may include a UE 802 and a UTRAN 804 communicating with each other via the radio interface 101. Regarding the UTRAN 804, it may include a measurement and decision block (e.g., an SIR measurement and TPC decision block 822) and the aforementioned MUX 126, BLER measurement blocks 124 and 624, and DEMUX 303, where the BLER measurement blocks 124 and 624 may act as channel quality estimators used for estimating channel quality of different wireless communication channels and setting target channel quality values, respectively. It should be noted that, in this exemplary embodiment, the combination of the SIR measurement and TPC decision block 822 and the BLER measurement blocks 124 and 624 serves as a power adaptation apparatus 801. Regarding the UE 802, it may include a MUX 816 and the aforementioned UL power control block 112 and DEMUX 114, where the MUX 816 can multiplex a UL signal on DCH and a UL signal on E-DCH. Regarding the BLER measurement block 124, it is capable of obtaining a measured BLER of DCH, and then increasing or decreasing a corresponding target radio/channel quality value (e.g., an estimated SIR $SIR_{target\_DCH}$ for achieving a target BLER of DCH) according to the measured BLER. Regarding the BLER measurement block 624, it is capable of obtaining a measured BLER of E-DCH, and then increasing or decreasing a corresponding target radio/channel quality value (e.g., an estimated SIR $SIR_{target\_E-DCH}$ for achieving a target BLER of E-DCH) according to the measured BLER. In this embodiment, the SIR measurement and TPC decision block 822 is capable of receiving the target channel quality values $SIR_{target\_DCH}$ and $SIR_{target\_E-DCH}$, and determining a desired channel quality value (e.g., a desired SIR value $SIR_{target\_overall}$) according to $SIR_{target\_DCH}$ and $SIR_{target\_E-DCH}$. By way of example, but not limitation, $SIR_{target\_overall}$ may be set by a maximum value selected from $SIR_{target\_DCH}$ and $SIR_{target\_E-DCH}$. In other words, $SIR_{target\_overall}$ can be equal to Max ($SIR_{target\_DCH}$, $SIR_{target\_E-DCH}$, . . . ). It should be note that only two UL transport channels (e.g., DCH and E-DCH) are shown in FIG. 8 for illustrative purposes. In practice, the exemplary power adaptation mechanism shown in FIG. 8 has no limitation on the number of UL transport channels.

After the estimated SIR values of different UL transport channels (e.g., WCDMA channel and HSUPA channel) are obtained, the desired SIR value $SIR_{target\_overall}$ can be dominated by a UL transport channel which requests the strictest signal quality. As $SIR_{target\_overall}$ can be set under the condition where all of the UL transport channels are taken into consideration, all of the UL transport channels could achieve respective target BLERs. More specifically, the SIR measurement and TPC decision block 822 is capable of measuring the actual channel quality value (i.e., $SIR_{est}$), and comparing the measured channel quality value with the desired channel quality value (i.e., $SIR_{target\_overall}$). When $SIR_{est}$ is found smaller than $SIR_{target\_overall}$, implying that the actual channel quality of the UL transport channel (e.g. the UL transport channel that requests the strictest signal quality) is lower than the desired one, the SIR measurement and TPC decision block 822 may therefore generate an "UP" TPC command, and transmits the "UP" TPC command to the UE 802 through the MUX 126. Next, the UL power (e.g., UL DPCCH power) can be increased by the UL power control block 112 due to the "UP" TPC command. When $SIR_{est}$ is found larger than $SIR_{target\_overall}$, implying that the actual channel quality of the UL transport channel (e.g. the UL transport channel that requests the strictest signal quality) is higher than the desired one, the SIR measurement and TPC decision block 822 may therefore generate a "DOWN" TPC command. Next, the UL power (e.g., UL DPCCH power) can be decreased by the UL power control block 112 due to the "DOWN" TPC command. Hence, when the UL transport channel which requests the strictest signal quality meets the target BLER due to the exemplary power adaptation mechanism, remaining UL transport channel(s) which request less strict signal quality could also meet target BLER(s).

Figure 9:
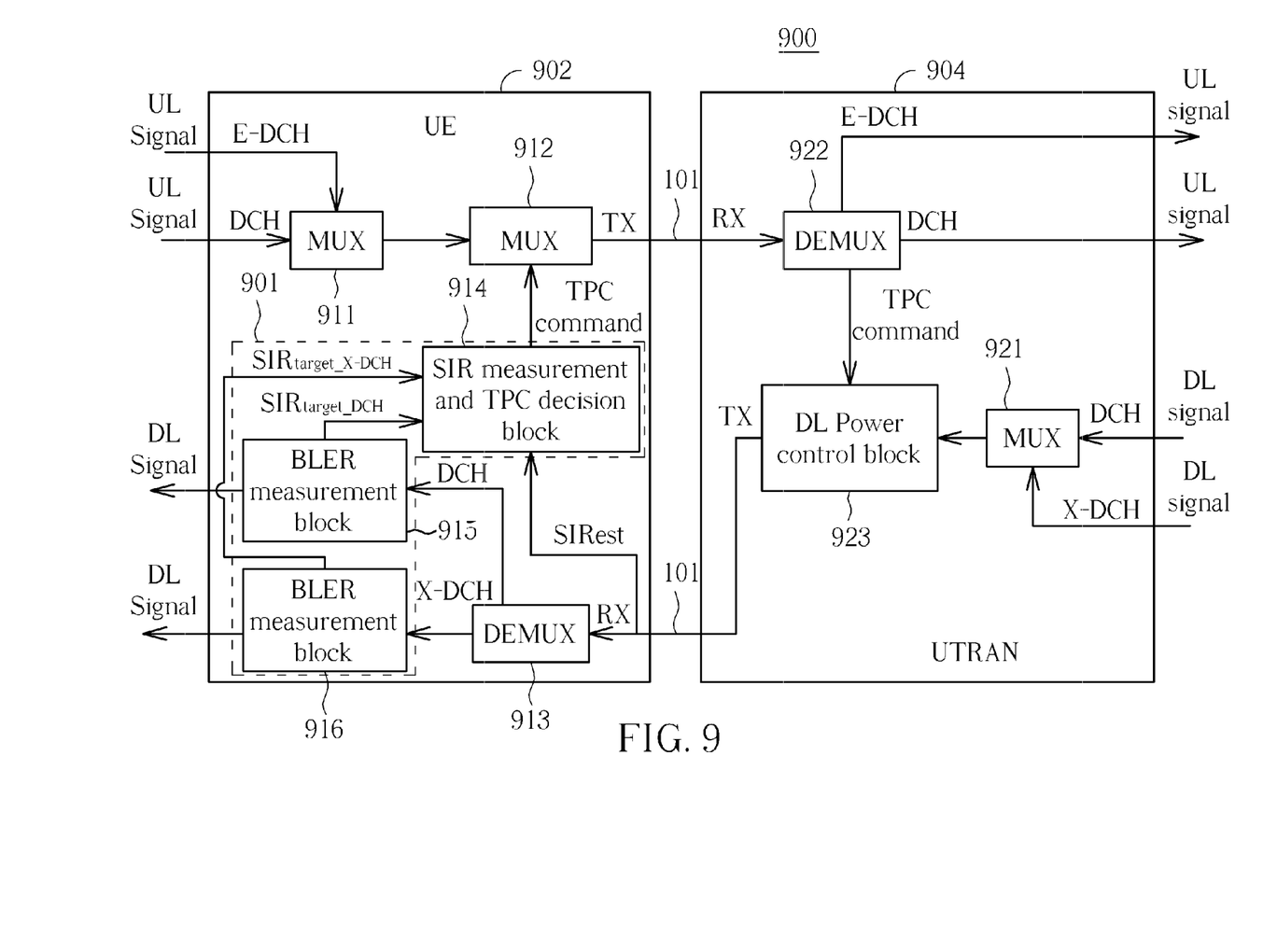
FIG. 9 is a block diagram illustrating a wireless communication system employing a DL power adaptation mechanism according to an exemplary embodiment of the present invention.

FIG. 9 is a block diagram illustrating a wireless communication system employing a DL power adaptation mechanism according to an exemplary embodiment of the present invention. The exemplary communication system 900 may include a UE 902 and a UTRAN 904 communicating with each other via the radio interface 101. Regarding the UE 902, it may include a plurality of MUXs 911 and 912, a DEMUX 913, a measurement and decision block (e.g., an SIR measurement and TPC decision block 914), and a plurality of channel quality estimators (e.g., BLER measurement blocks 915 and 916), where the combination of the SIR measurement and TPC decision block 914 and the BLER measurement blocks 915 and 916 may serve as a power adaptation apparatus 901. Regarding the UTRAN 904, it may include a MUX 921, a DEMUX 922, and a DL power control block 923. The MUX 921 can multiplex a DL signal on one dedicated channel DCH and a DL signal on another dedicated channel X-DCH. The DEMUX 922 can demultiplex a UL signal on E-DCH, a UL signal on DCH, and a TPC command generated from the SIR measurement and TPC decision block 914. The DL power control block 923 can increase/decrease power of the DL physical channel in response to the TPC command. The MUX 911 can multiplex a UL signal on E-DCH and a UL signal on DCH. The DEMUX 913 can demultiplex a DL signal on DCH and a DL signal on X-DCH.

Regarding the BLER measurement block 915, it is capable of obtaining a measured BLER of DCH, and then providing (e.g. increasing or decreasing) a corresponding target radio/channel quality value (e.g., an estimated SIR $SIR_{target\_DCH}$ for achieving a target BLER of DCH) according to the measured BLER. Regarding the BLER measurement block 916, it is capable of obtaining a measured BLER of X-DCH, and then providing (e.g. increasing or decreasing) a corresponding target radio/channel quality value (e.g., an estimated SIR $SIR_{target\_X-DCH}$ for achieving a target BLER of X-DCH) according to the measured BLER. In this embodiment, the SIR measurement and TPC decision block 914 is capable of receiving the target channel quality values $SIR_{target\_DCH}$ and $SIR_{target\_X-DCH}$, determining a desired channel quality value (e.g., a desired SIR value $SIR_{target\_overall}$) according to $SIR_{target\_DCH}$ and $SIR_{target\_X-DCH}$. By way of example, but not limitation, $SIR_{target\_overall}$ may be set by a maximum value selected from $SIR_{target\_DCH}$ and $SIR_{target\_X-DCH}$. In other words, $SIR_{target\_overall}$ can be equal to Max ($SIR_{target\_DCH}$, $SIR_{target\_X-DCH}$, . . . ). It should be note that only two DL transport channels (e.g., DCH and X-DCH) are shown in FIG. 9 for illustrative purposes. In practice, the exemplary power adaptation mechanism shown in FIG. 9 has no limitation on the number of DL transport channels.

After the estimated SIR values of different DL transport channels are obtained, the desired SIR value $SIR_{target\_overall}$ can be dominated by a DL transport channel which requests the strictest signal quality. As $SIR_{target\_overall}$ can be set under the condition where all of the DL transport channels are taken into consideration, all of the DL transport channels could meet respective target BLERs. More specifically, the SIR measurement and TPC decision block 914 is capable of measuring the channel quality value (i.e., $SIR_{est}$), and comparing the measured channel quality value with the desired channel quality value (i.e., $SIR_{target\_overall}$). When $SIR_{est}$ is found smaller than $SIR_{target\_overall}$, implying that the actual channel quality of the DL transport channel (e.g. the DL transport channel that requests the strictest signal quality) is lower than the desired one, the SIR measurement and TPC decision block 914 may therefore generate an "UP" TPC command, and transmits the "UP" TPC command to the UTRAN 904 through the MUX 912. Next, the DL power (e.g., DL DPCCH power) can be increased by the DL power control block 923 due to the "UP" TPC command. When $SIR_{est}$ is found larger than $SIR_{target\_overall}$, implying that the actual channel quality of the DL transport channel (e.g. the DL transport channel that requests the strictest signal quality) is higher than the desired one, the SIR measurement and TPC decision block 914 may therefore generate a "DOWN" TPC command. Next, the DL power (e.g., DL DPCCH power) can be decreased by the DL power control block 923 due to the "DOWN" TPC command. Thus, when the DL transport channel which requests the strictest signal quality meets the target BLER due to the exemplary power adaptation mechanism, remaining DL transport channel(s) which request less strict signal quality could also meet target BLER(s).

By way of example, but not limitation, the measurement and decision block may include one element, such as a hardware element, used for receiving the target channel quality values, another element, such as a hardware element, used for determining the desired channel quality value according to the target channel quality values, and yet another element, such as a hardware element used for controlling a power control block according to the measured channel quality value and the desired channel quality value. In an alternative design, the measurement and decision block may be implemented by a processor which is capable of receiving the target channel quality values, and executing a software program (e.g., firmware) for determining the desired channel quality value according to the target channel quality values and controlling the power control block according to the measured channel quality value and the desired channel quality value. To put it simply, the aforementioned power adaptation apparatus may be implemented by any feasible means, depending upon actual design requirement/consideration.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power adaptation apparatus for a wireless communication channel, comprising:
   a channel quality estimator, generating a channel quality indicator by estimating error rate of an enhanced dedicated channel (E-DCH); and
   a power ratio compensator, receiving the channel quality indicator and compensating a power ratio parameter according to the channel quality indicator, wherein the power ratio parameter defines a relation between power of the wireless communication channel and power of another wireless communication channel, and is referenced for setting the power of the wireless communication channel;
   wherein the error rate of the E-DCH is estimated by referring to information received from the E-DCH hybrid automatic repeat request indicator channel (E-HICH).

2. The power adaptation apparatus of claim 1, wherein the wireless communication channel is an uplink (UL) channel.

3. The power adaptation apparatus of claim 2, wherein the UL channel is of a high speed uplink packet access (HSUPA).

4. The power adaptation apparatus of claim 1, wherein the channel quality estimator generates the channel quality indicator by estimating the block error rate (BLER) according to acknowledgement (ACK) indicators and/or negative acknowledgement (NACK) indicators of the enhanced dedicated channel (E-DCH).

5. A power adaptation method for a wireless communication channel, comprising:
   generating a channel quality indicator by estimating error rate of an enhanced dedicated channel (E-DCH);
   receiving a channel quality indicator; and
   compensating a power ratio parameter according to the channel quality indicator, wherein the power ratio parameter defines a relation between power of the wireless communication channel and power of another wireless communication channel, and is referenced for setting the power of the wireless communication channel;
   wherein the error rate of the E-DCH is estimated by referring to information received from the E-DCH hybrid automatic repeat request indicator channel (E-HICH).

6. The power adaptation method of claim 5, wherein the wireless communication channel is an uplink (UL) channel.

7. The power adaptation method of claim 6, wherein the UL channel is of a high speed uplink packet access (HSUPA).

8. The power adaptation method of claim 5, wherein the channel quality indicator is generated by estimating the block error rate (BLER) according to acknowledgement (ACK) indicators and/or negative acknowledgement (NACK) indicators of the enhanced dedicated channel (E-DCH).

* * * * *